United States Patent
Quijada et al.

(10) Patent No.: US 9,661,913 B2
(45) Date of Patent: May 30, 2017

(54) FOOD PACKAGE HOLDER (71) Applicants: Mike Quijada, San Marcos, CA (US); John Paladino, San Marcos, CA (US)

(72) Inventors: Mike Quijada, San Marcos, CA (US); John Paladino, San Marcos, CA (US)

(*) Notice: Subject to any disclaimer, the term of this patent is extended or adjusted under 35 U.S.C. 154(b) by 0 days.

(21) Appl. No.: 14/617,650

(22) Filed: Feb. 9, 2015

(65) Prior Publication Data
US 2015/0223589 A1 Aug. 13, 2015

Related U.S. Application Data (60) Provisional application No. 61/937,743, filed on Feb. 10, 2014.

(51) Int. Cl.
*B62J 11/00* (2006.01)
*A45F 5/02* (2006.01)

(52) U.S. Cl.
CPC .............. *A45F 5/02* (2013.01); *B62J 11/00* (2013.01)

(58) Field of Classification Search
CPC ....... B65D 75/70; B65D 75/5811; B62J 11/00
USPC .......... 224/419–420, 424–425, 427
See application file for complete search history.

(56) References Cited

U.S. PATENT DOCUMENTS

| | | | |
|---|---|---|---|
| 1,722,086 A * | 7/1929 | Hammerle | B65D 77/02 206/239 |
| 4,878,274 A * | 11/1989 | Patricy | A44B 18/00 24/306 |
| 5,127,563 A | 7/1992 | Chan et al. | |
| 5,150,824 A | 9/1992 | Alvarez et al. | |
| 5,803,328 A | 9/1998 | Nakahara | |
| 5,803,333 A | 9/1998 | Fawcett | |
| 5,862,965 A | 1/1999 | Nakahara | |
| 5,887,774 A * | 3/1999 | Bethune | B60R 7/08 215/383 |
| 5,913,466 A | 6/1999 | Revels | |
| 6,045,020 A * | 4/2000 | Rassier | B62J 11/00 224/148.5 |
| 6,176,405 B1 | 1/2001 | Roach | |
| 2008/0078791 A1* | 4/2008 | Toce | A45C 13/30 224/222 |
| 2009/0261135 A1* | 10/2009 | Robichaux | B62J 11/00 224/414 |
| 2010/0059564 A1 | 3/2010 | Bretl et al. | |
| 2010/0072238 A1* | 3/2010 | Pape | B62J 9/005 224/425 |
| 2010/0084422 A1 | 4/2010 | Robota | |
| 2011/0006171 A1 | 1/2011 | Green | |
| 2013/0032001 A1 | 2/2013 | Smart | |
| 2013/0056954 A1 | 3/2013 | Arrow | |
| 2015/0182008 A1* | 7/2015 | Kattouf, II | A45F 5/00 224/222 |

* cited by examiner

*Primary Examiner* — Nathan J Newhouse
*Assistant Examiner* — Scott McNurlen
(74) *Attorney, Agent, or Firm* — Mark Wisnosky (57) ABSTRACT

A food package holder is described. The food package holder can accommodate a plurality of food packages and hold them in position such that they are readily accessible to the user. The food package holder is especially useful to participants in sporting events where access to nourishment is otherwise not readily available during the event.

2 Claims, 9 Drawing Sheets

FOOD PACKAGE HOLDER

CROSS-REFERENCE TO RELATED APPLICATIONS

This application claims benefit of the U.S. Provisional Application No. 61/937,743, titled Food Package Holder, filed on Feb. 10, 2014, by the same inventors.

BACKGROUND OF THE INVENTION

Technical Field

The present invention relates to food packaging especially suitable for use in a sporting or other activity.

Related Background Art

Athletes involved in endurance sports have always required food during an event for replenishment. Frequently the food was provided in rest stops or at least feed zones where food is handed to the athlete. The stops or feed zones typically are recognized as a neutral point or zone in a race or event. Outside of the feed zones athletes now can also rely on supplements mixed in water bottles that are carried along and on high caloric supplements like gels that are typically packaged in flexible squeezable packaging or on energy bars that are wrapped in foil or other tearable flexible packages. In many cases the athlete carries these food supplement packages in backpacks or pouches. In a typical cycling event the athlete has pockets in their jersey to hold food packages. Access to these pockets requires that athlete to reach behind their back and blindly find the food packet of choice by feel. This searching requires them to take a hand off the handlebars of the cycle which in many cases can be a dangerous maneuver resulting in crashes and injury. Although there are some forms of carriers that the athlete wears or are attached to their cycle there is nothing that allows quick easy access and selection of a particular food package without distracting from the handling of their cycle.

There is a need for an improved packaging for food products that can be used by an athlete during an activity. There is a need for such packaging to aloe the athlete to select from an array of products during an event without being overly distracted from their activity. There is a need for a packaging that can be both used in retail and can also be easily attached to a person or an apparatus such as a bicycle frame in a position easily accessed by a rider. There is a need for a food package holder that the athlete can load with their favorite food product and that can then be attached to the person or an apparatus such as a bicycle frame for use during an athletic event.

DISCLOSURE OF THE INVENTION

A system is described that addresses the deficiencies described above. A food packaging system that includes a holder for multiple food packages, the food packages themselves and a means for removably attaching an array of food packages to a person's clothing or to an apparatus such as a bicycle frame are described. In one embodiment a new packaging for processed food product that includes a plurality of individual packets is described. The individual packets are attached to a support member and may selected and removed individually. In a preferred embodiment removable is by a single motion that both removes a selected package and simultaneously opens the package for consumption of its contents.

Another embodiment includes a packaging system that is used both for store display as well as use in a multiple package configuration by the consumer. As a store display the packaging is presented in manner that allows easy selection of a multiple pack and as a consumer product the package may be attached to the user's clothing or to an apparatus such as a bicycle frame for easy access and use during a sporting event.

Another embodiment includes a support configured such that individual food packages may be attached to the support to be carried with the user during an athletic event and removed individually for consumption. Another embodiment further includes means for attachment of the support to a user's clothing. Another embodiment includes means for attaching the support to an apparatus such as a bicycle frame.

MODES FOR CARRYING OUT THE INVENTION

Figure 1:
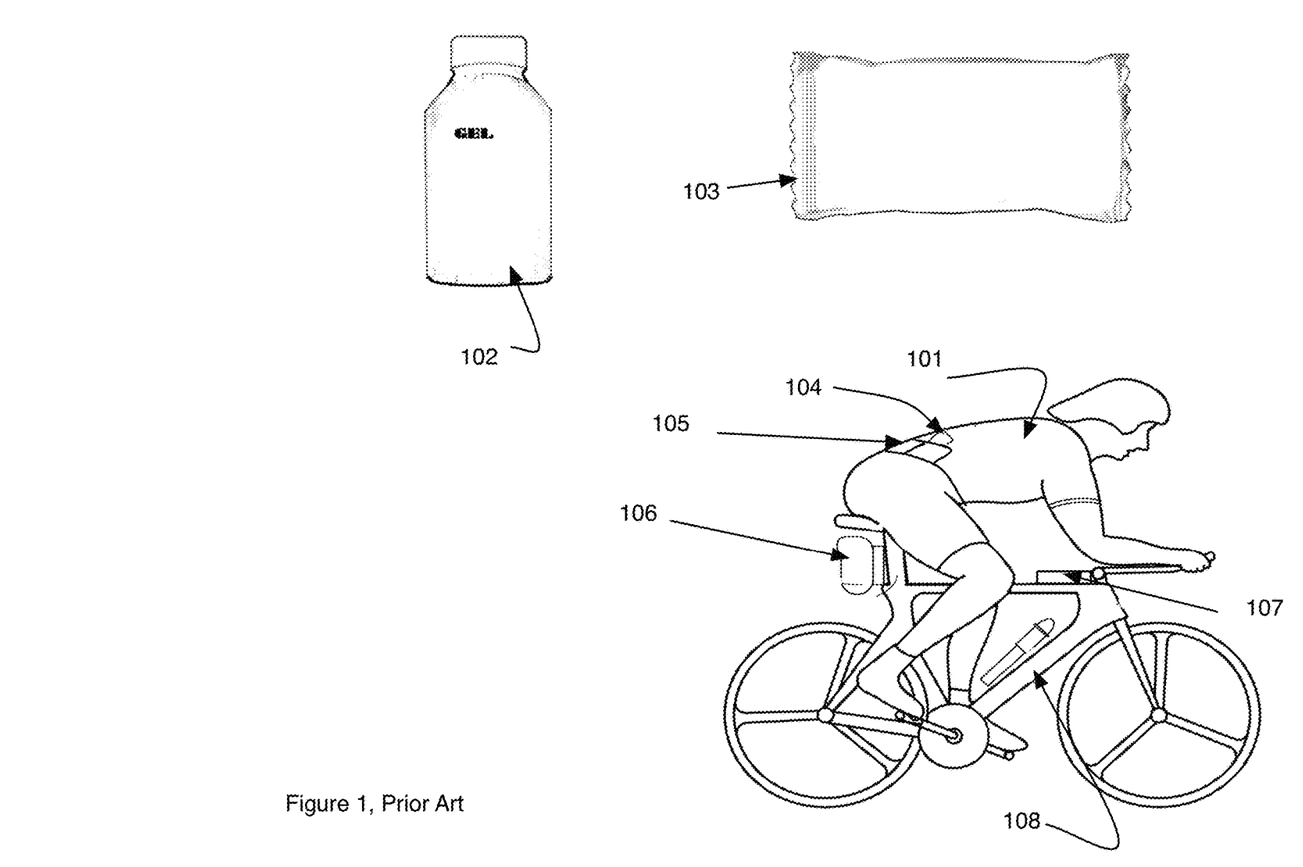
FIG. 1 is a diagram showing prior art.

Referring to FIG. 1, examples of prior art for carrying food by a cyclist are shown. A cyclist 101 is wearing a jersey that includes pockets 105. There are also containers mounted on the cycle frame itself. A first 106 located behind the cyclist and a second 107 mounted on the top tube of the bicycle frame 108. Food packaging typically comes in packets 102 that are filled with a high calorie gel material or in packages 103 that contain energy bars. Either form of the packages 104 are typically carried in the pocket 105 of the jersey or within the containers 106, 107. The cyclist is required to reach behind his back for packages within the pocket while riding. The packages are not visible to the cyclist and selection of one from an array of packages in the pocket must be done by feel or by multiple hit or miss selections. The containers 106, 107 are typically closed using zipper or Velcro closures and access while moving especially to a container on the back of the cycle 106 is very difficult and perhaps dangerous. Access to a container in front of the rider may make the task less difficult and dangerous but does not provide an easy means to select from a plurality of fixed packages with a means to select one from a variety and to open the package in a single motion as do the embodiments of the present invention, the first described in FIG. 2.

Figure 2:
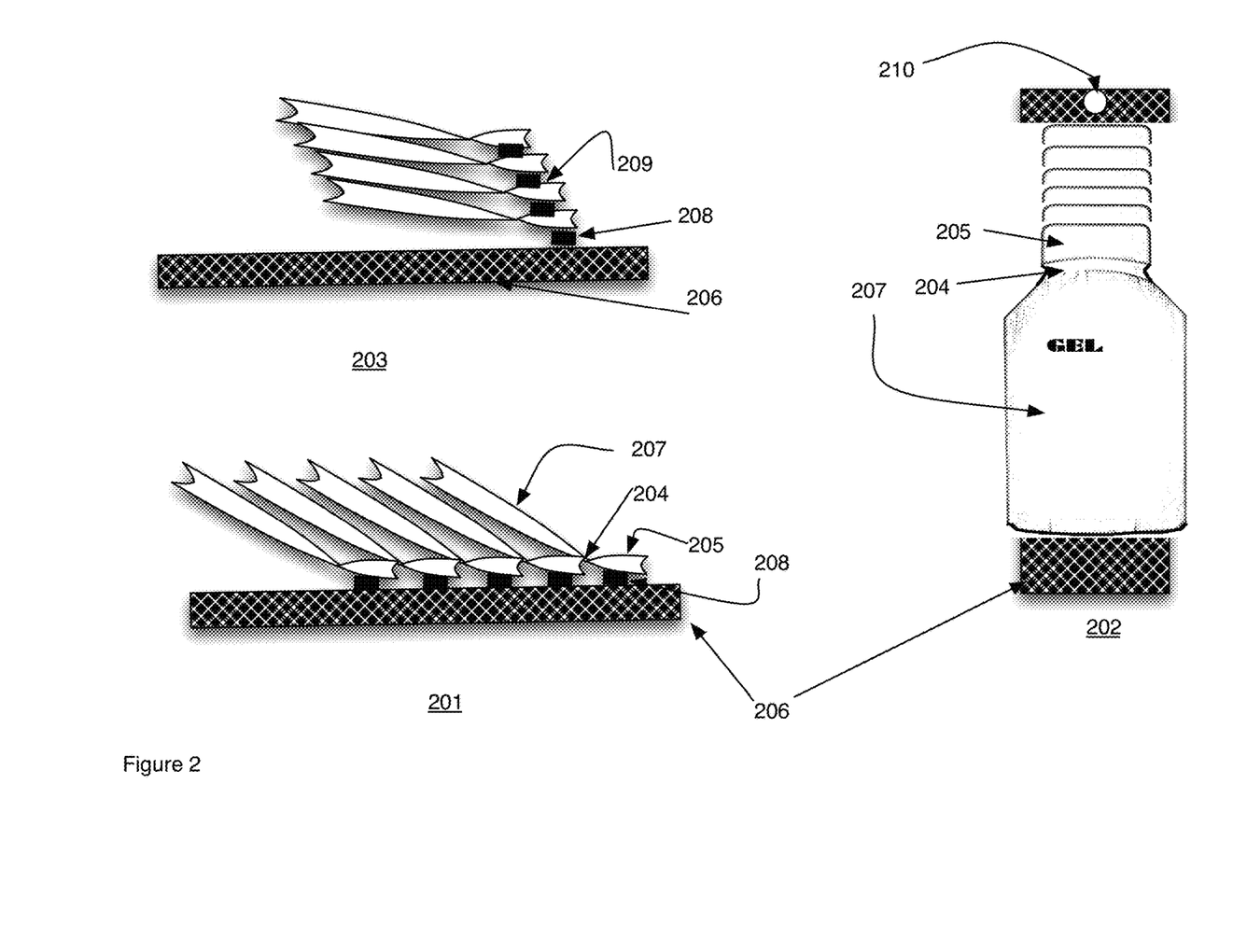
FIG. 2 is a diagram of multiple package food packaging system.

Referring now to FIG. 2, two embodiments of a multiple package system for food packages are shown. In a first embodiment shown in cross section 201 and in a front view

202, multiple packages are attached to a substrate 206. Each package is comprised of a body 207 a tear point 204 and an attachment region 205. The food product is enclosed within the body 207 of the package. The attachment region 205 of the food package is attached to a support 206 through an attachment means 208. Non-limiting exemplary attachment means include glue, staples, and fused thermoplastic. In a preferred embodiment the attachment to the support is selected to be sufficiently strong such that upon pulling the body 207 of the package the tear point 204 fails before the attachment point releases from the support thereby opening the package at the tear point in a single motion on removing an individual package from the support 206.

In a second embodiment 203, shown in cross-section, the multiple packages are attached together through attachment means 209 and the thereby formed bundle of packages are attached to the support at a single point 208. The attachment means 209 may be similarly selected from the examples already presented for the attachment means 208 to the base. The attachment means 209 and 208 are not necessarily the same. The strength of the attachment means 209 is selected such that the tear point of the package fails before the attachment means 209 to an adjoining package fails. The strength of the attachment 208 to the support base is selected to be stronger than the tear point of the package as well as stronger than the attachment 209 between individual packages.

In another embodiment (not shown) packages are attached to a support base 206 by either of the means 201, 203 shown in FIG. 2 but the packages are configure more conventionally without a tear away region, much as the package 103 shown in FIG. 1. In this case the system offers a means for easy access to an array of packages but does not necessarily open the package in the same motion as removing it from the support base.

Either of the embodiments 201, 203 as well as the version not shown, but described in the preceding paragraph, the multiple package system also acts as a store display. The support base includes a means 208 for attachment to a shelf display. In one embodiment the means is a hole punched through the support base. In another embodiment, not shown, the support base and packages are further wrapped in another packaging material for shelf display.

Figure 3:
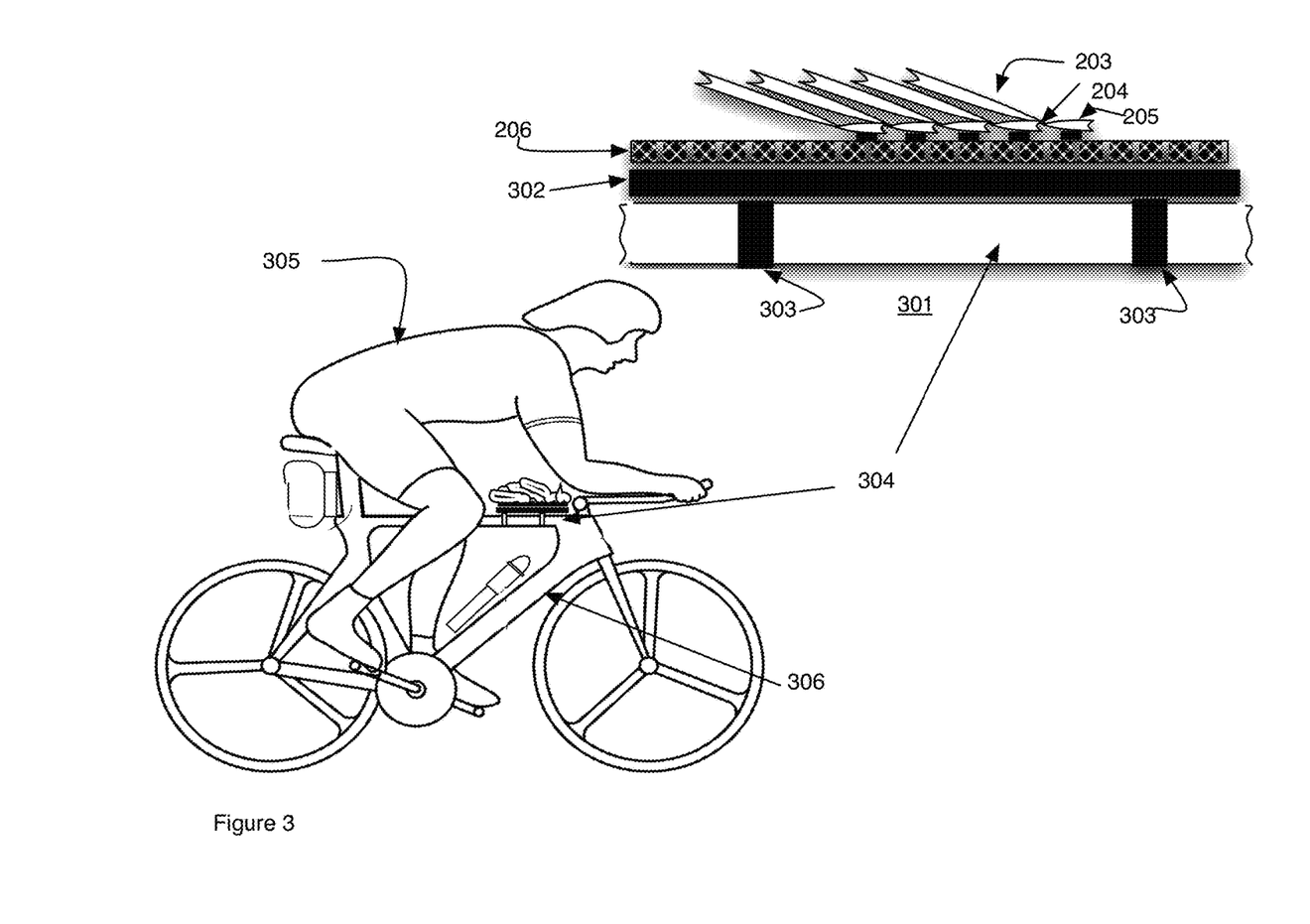
FIG. 3 shows the multiple package system of FIG. 2 as attached to a bicycle frame.

Another embodiment, that includes attachment of the embodiments described in conjunction with FIG. 2, is shown in FIG. 3. A cyclist 305 is riding a bicycle with a frame 306 the frame includes a top tube 304. The first embodiment of the packaging system 203 that was described in FIG. 2 is seen attached to the top tube 304 of the bicycle. The package components 203, 204, 205 are seen attached to the package support base 206 as already discussed. In one embodiment the attachment includes an attachment base 302. The base 302 is attached to the top tube using attachment means 303. In the illustrated case the attachment means are straps that wrap around the top tube. In the preferred embodiment the straps include hook and latch material. In one embodiment the package support base 206 and the attachment base 302 are both made of hook and latch material such that they are removably joined together and then attached to the bicycle using straps also of hook and latch material. Although the embodiment shows the multiple package packaging system attached to a bicycle, a similar conformation can be attached to other equipment such as exercise equipment, backpacks for hiking and hiking sticks. It should also be clear to those skilled in the art that any of the configurations described in conjunction with FIG. 2 are applicable to the attachment shown in FIG. 3.

Figure 4:
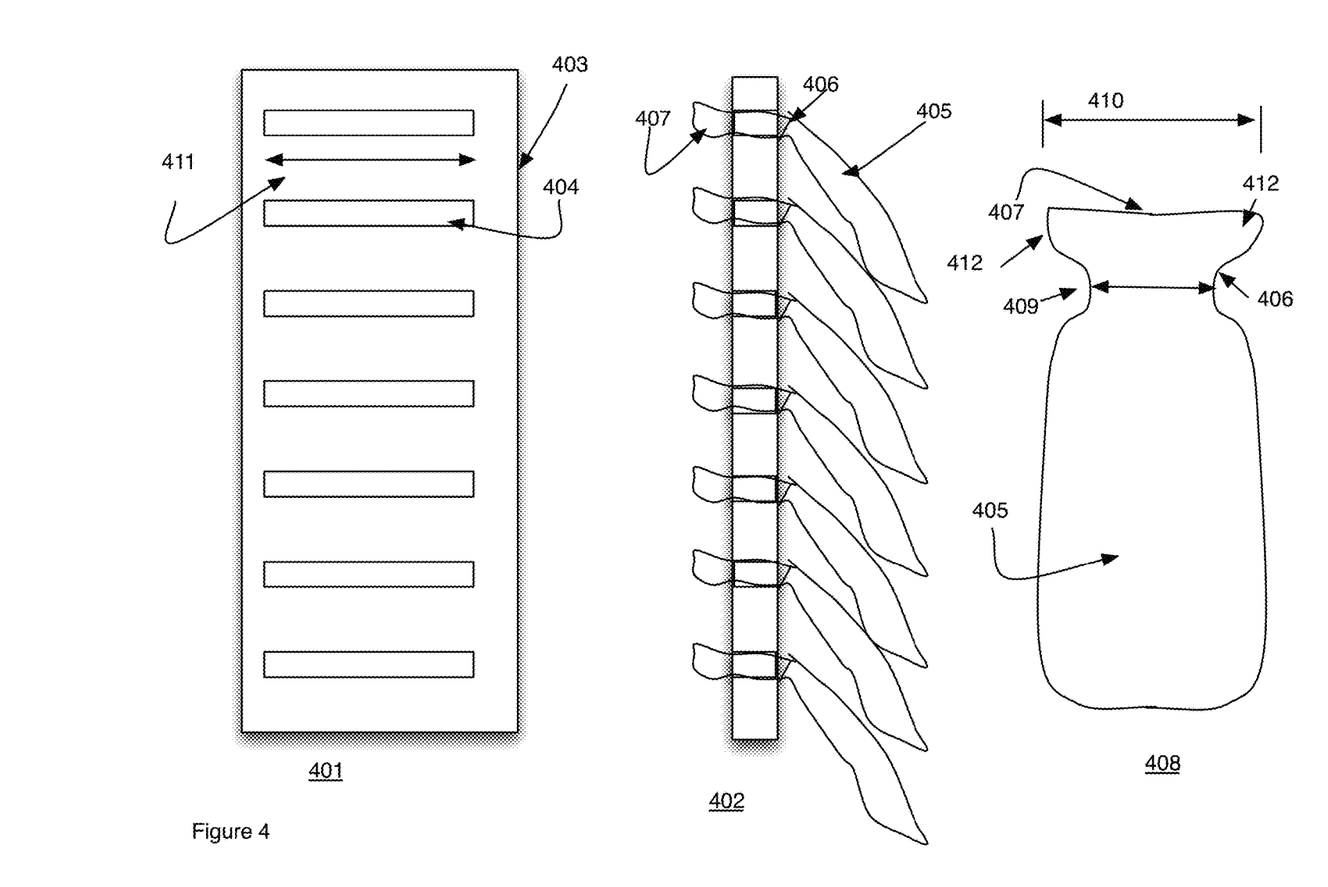
FIG. 4 shows a second embodiment of a multiple package food packaging system where packages may be individually selected for attachment.

In another embodiment, shown in FIG. 4, a package support base 403 is comprised of a series of slots 404 cut through the base. The first view 401 shows the face of the package support base and the second view 402 shows a side view, cross-sectional view of the package support base. The packages are seen in a front view 408 to be comprised of a package body 405, a tear away region 406 and a package top 407. The top of the package 407 is pushed through the slot 404 to secure the individual packages in position. In a preferred embodiment the width 410 of the top of the individual package is wider than the width of the slot 411 in the package support base. The width 409 at the tear away region 406 is selected to just fit the width 411 of the slot such that in order to insert the package into the slot the "ears" 412 of the package are folded inward such that they can be pushed through the slot 411 and then unfolded to secure the package in the slot. The embodiment allows individual packages to be selected by the user to load a package support base with an individual's preference. The package support base may then be attached to clothing or an apparatus such as a bicycle for access to the food packages during an exercise event. In one embodiment the package support base 403 is made of hook and latch material and options for attachment to an attachment base is as already described in FIG. 3.

Figure 5:
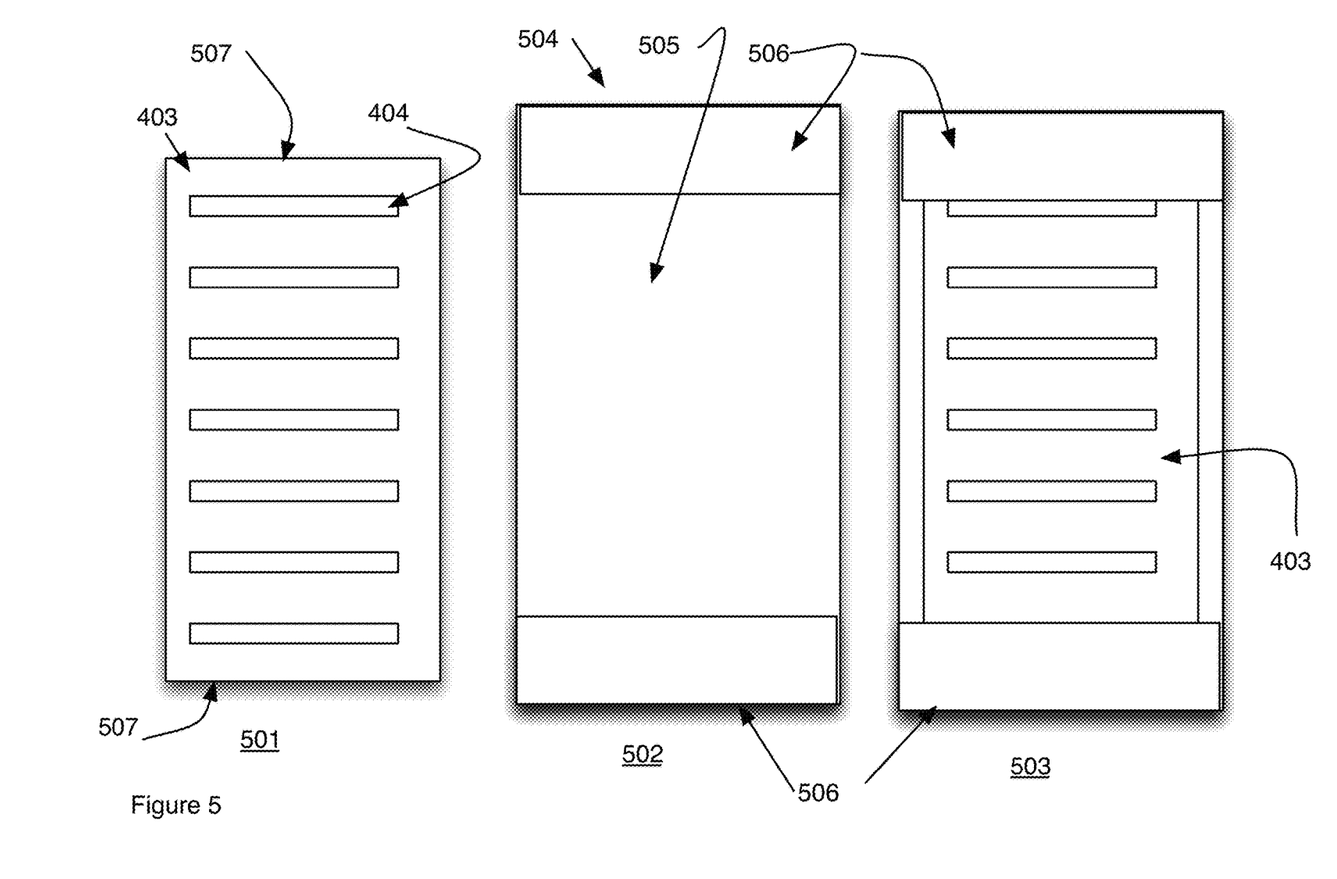
FIG. 5 shows the embodiment of FIG. 4 further including a support member for attachment to clothing or to an apparatus.

In another embodiment, shown in FIG. 5, an attachment base 504 is comprised of a substantially flat card material 505 that in the illustrated view 502 is rectangular and a slight enlargement of the package support base 403 shown in a first view 501. The attachment base further includes pockets 506 at either end such that the ends 507 of the package support base may be tucked into the pockets 506 to produce the assembly shown in the third view 503 where the package support base 403 is held to the attachment base by means of the pockets 506. A side cross-sectional view of the assembly of view 503 as attached to an apparatus such as a bicycle top tube is shown in FIG. 6.

Figure 6:
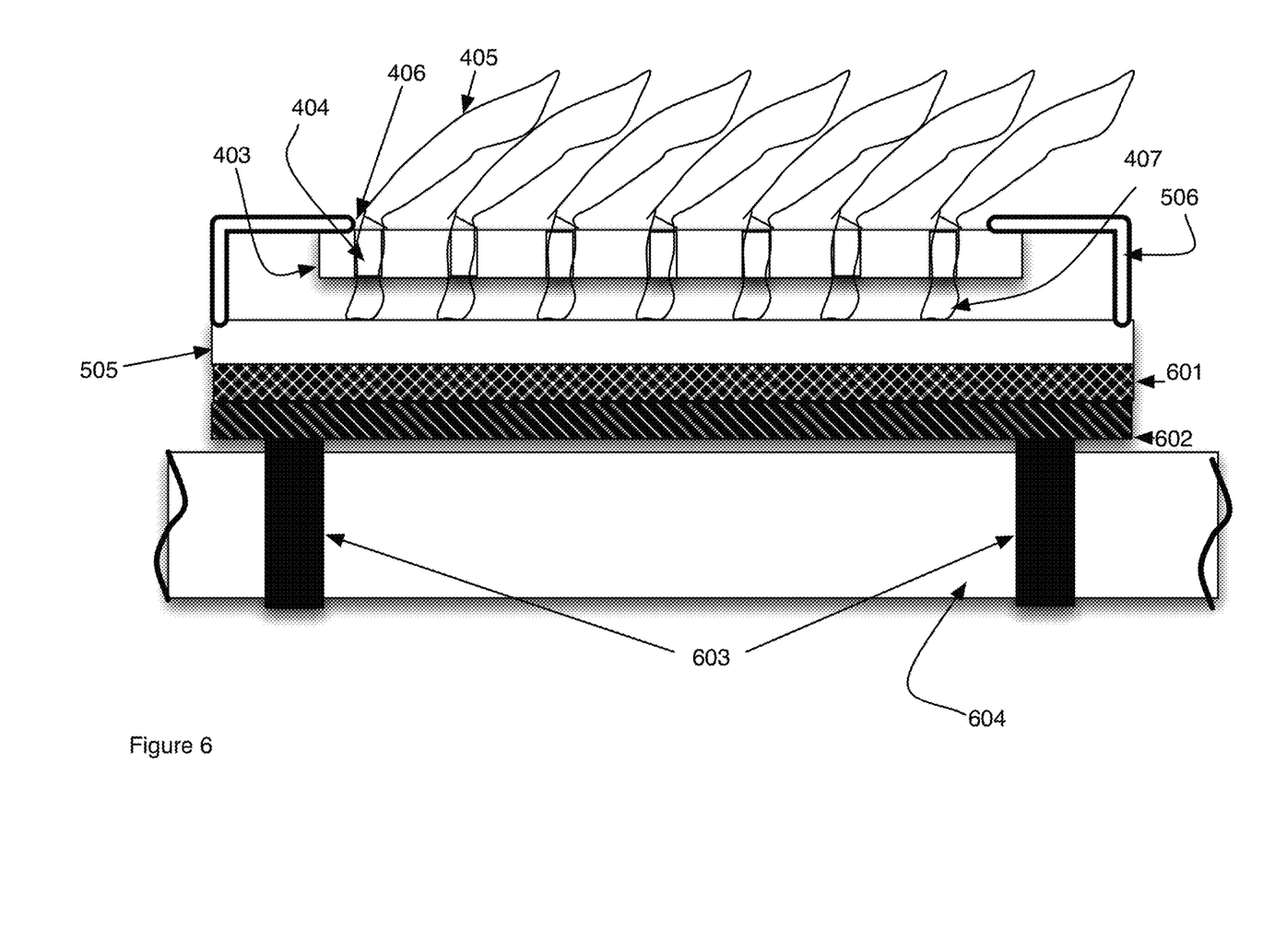
FIG. 6 shows the embodiment of FIGS. 4 and 5 attached to an apparatus.

Referring to FIG. 6 the package support base 403 including the slots 404 and packaging inserted through the slots 405, 406, 407 is seen. The packaging is comprised of a body 405, a tear section 406 and a top portion 407 the top portion having passed through the slot 404 to secure the package to the package support base. The components of the attachment base including the substantially flat card material 505 and the pockets 506 are also seen. The attachment base further includes attachment material 601 that interacts and is removably affixed to attachment material 602 that is attached to the apparatus 604 through use of a pair of straps 603. In a preferred embodiment the attachment materials 601, 602 are hook and latch material. Glue, mechanical methods and magnets may also be used instead of hook and latch material to attach the support base to the attachment material on the apparatus.

Figure 7:
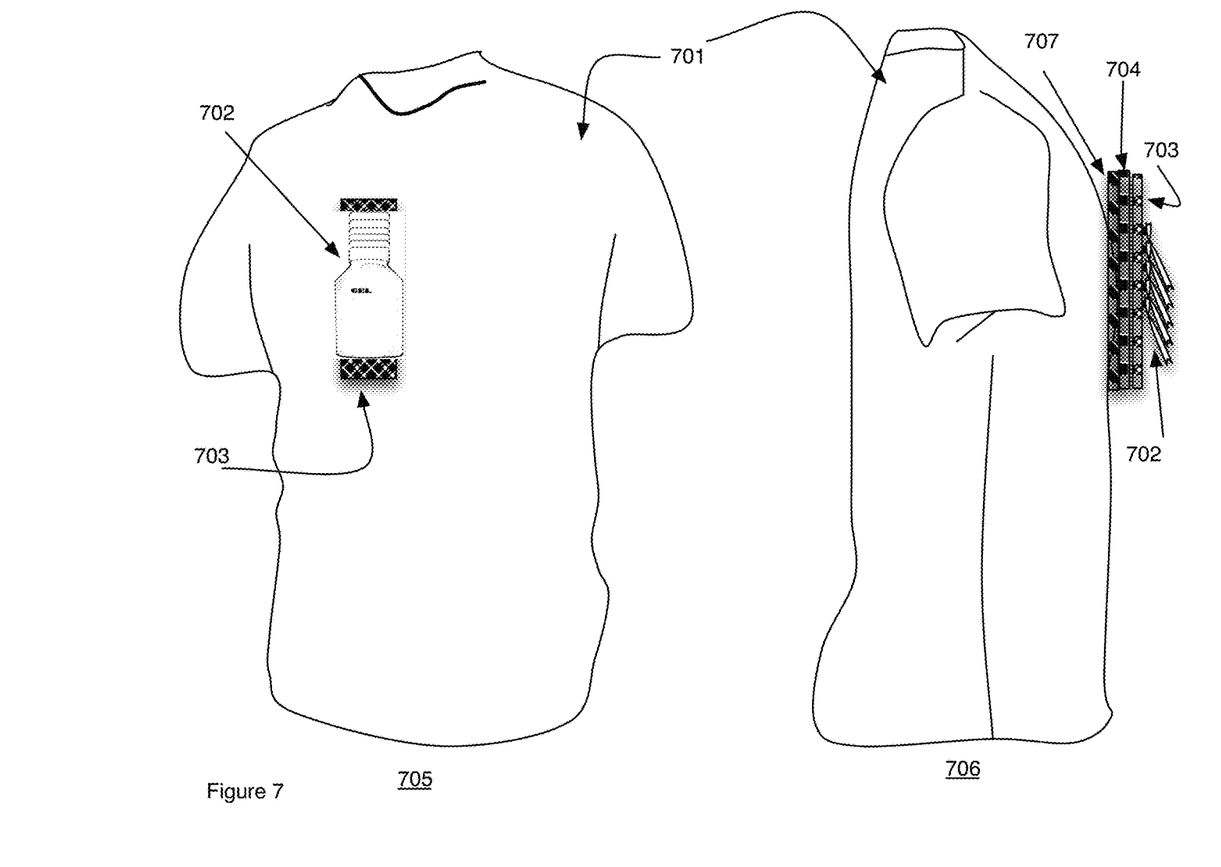
FIG. 7 shows the embodiment of FIG. 2 as attached to an article of clothing.
Figure 8:
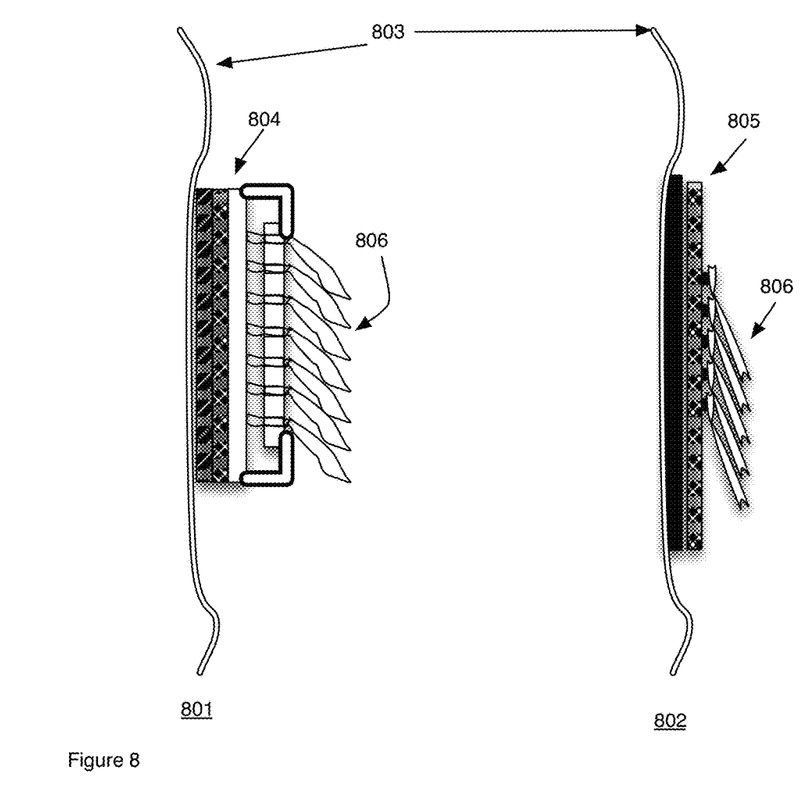
FIG. 8 shows a cross-sectional view of the embodiment of FIG. 2 and the embodiment of FIGS. 4 and 5 as attached to an article of clothing.

In another embodiment shown in FIGS. 7 and 8 the food package system is shown attached to clothing 701. Both a front view 705 and a side view 706 are shown. The food packages 702 are attached to a package support base 703 in much the same manner that has been described above. In the side view 706 it is seen that the package support base 703 is attached to an attachment base 704, which in turn is, attached to a corresponding attachment material 707 that is attached to the clothing.

Attachment to the clothing may be accomplished by many of the means already discussed and in addition the material may be sewn to the clothing. In another embodiment the product support base and the attachment base are incorporated into the same material. That is the layers 703 and the layer 704 are combined into a single layer of material that attached to the attachment piece 707 on the clothing.

Referring to FIG. 8 two embodiments of he food package holder are seen attached to a fabric base 803. In the first view 801 the food package holder 804 is substantially as that described in FIGS. 4, 5 and 6. In the second view 802 the food package holder 805 is substantially as described in FIGS. 2 and 3. A plurality of food packages 806 are removably attached to a fabric base 803. The food packages are attached to the food package holder and may be removably attached to the clothing. The packages are present in such a fashion that they may be removed from the food package holder and opened in a single pull motion by the user.

Figure 9:
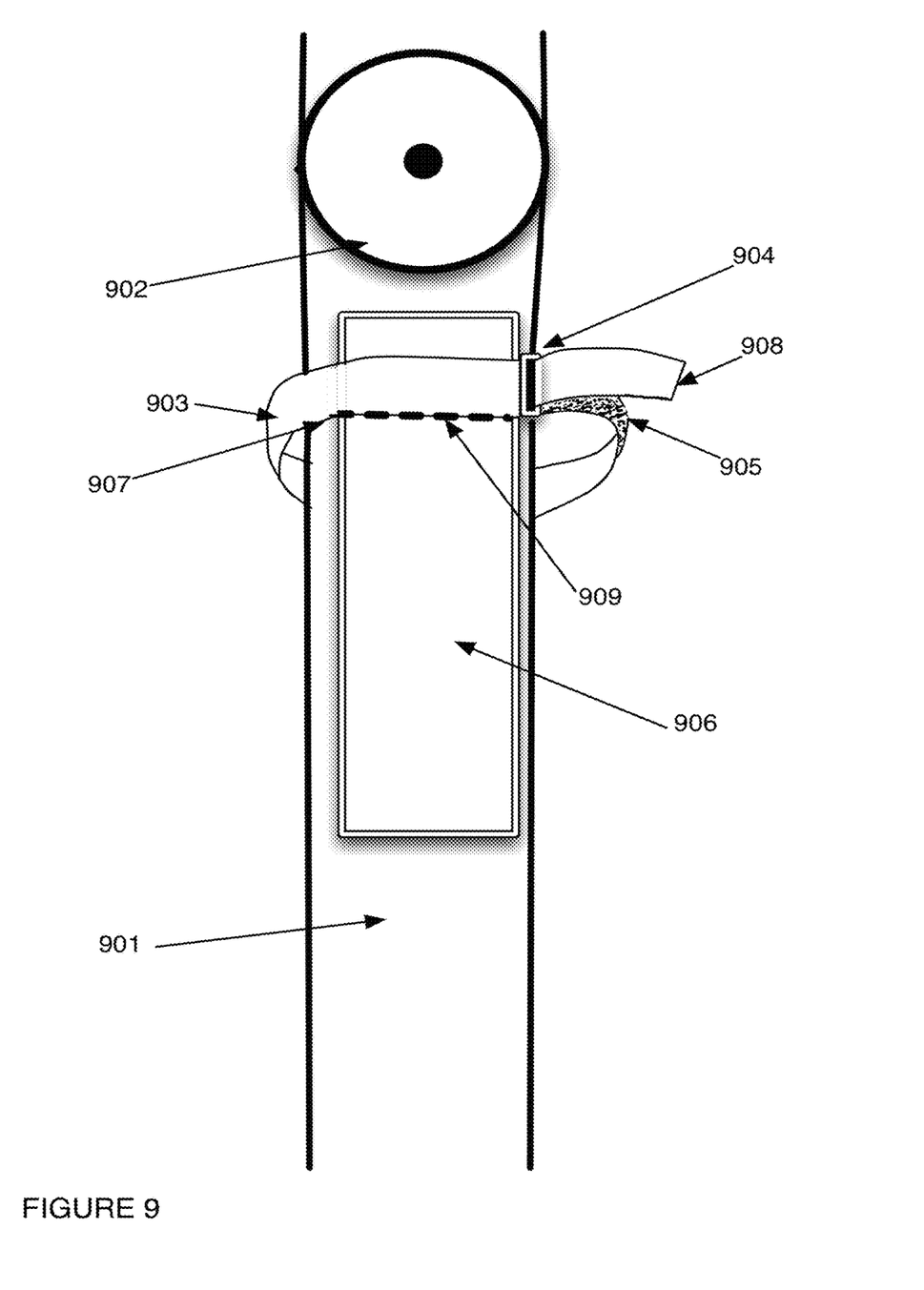
FIG. 9 shows an embodiment using a loop strap.

In another embodiment shown in FIG. 9 a food package holder 903 is shown attached to the top tube 901 of a bicycle. The headset 902 of the bicycle is shown for reference. The holder 903 is comprised of a rectangular strip of flexible material said strip having surfaces that when contacted may form a bond. In a preferred embodiment the surfaces include hook and latch material that has hook material on one side 908 and loop material on the other side 905. The holder 903 strip of material is rectangular having a length sufficiently long to wrap around the sporting equipment to which it is to attach and a width sufficient to hold the food package in place while the sporting equipment is in use. The width should be wide enough to hold the package in place with requiring such force that the package is damaged. The position of the hook and loop material may be interchanged. In another embodiment the hook and loop material is located only at one end of the loop 903. The food package 906 is held in place on the top 901 by placing on the top tube and threading the holder strip through a D-ring 904 and latching the hook material to the loop material to snugly hold the food package in place. In another embodiment at least one edge 907 of the strip of material further includes serrations 909 along the edge 907. The serrations are placed such that when the user pulls the package 906 from the holder 903 the package is cut or torn along the serrations thereby being opened for consumption.

SUMMARY

A food package holder is described. The food package holder can accommodate a plurality of food packages and hold them in position such that they are readily accessible to the user. The food package holder is especially useful to participants in sporting events where access to nourishment is otherwise not readily available during the event.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A food package holder for a food package said food package comprising a substantially flat rectangular pouch with a top flap region, a tear away zone below the flap region and a body holding a food product below the tear away zone such that when the body is pulled from the flap the tear away zone tears thereby opening the package for consumption said food package holder comprising:
   a) a rectangular strip of flexible material having a length substantially greater than its width and having two surfaces, two ends, and two edges, and,
   b) a D-ring attached to a first end of the rectangular strip the D-ring sized such that the second end of the rectangular strip may be fitted through the D-ring,
   c) a bonding material on the two surfaces of the rectangular strip near its second end whereby the rectangular strip may be looped around a cylinder, the second end fitted through the D-ring and the two surfaces of the second end affixed to one another to securely and removably hold the rectangular strip on the cylinder and thereby securing a food package placed between the rectangular strip and the cylinder, and,
   d) a serration along at least one edge of the rectangular strip said serration positioned such that when pulling the secured food package from the food package holder the food package is cut by the serration thereby opening the food package for consumption.

2. The food package holder of claim 1 wherein the bonding material is hook and loop material.

* * * * *